US010778926B2

(12) United States Patent
Spagnolo et al.

(10) Patent No.: US 10,778,926 B2
(45) Date of Patent: Sep. 15, 2020

(54) IMAGE SENSOR AND A METHOD FOR READ-OUT OF PIXEL SIGNAL

(71) Applicant: IMEC VZW, Leuven (BE)

(72) Inventors: Annachiara Spagnolo, Leuven (BE); Jonathan Borremans, Lier (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 16/458,641

(22) Filed: Jul. 1, 2019

(65) Prior Publication Data

US 2020/0021765 A1   Jan. 16, 2020

(30) Foreign Application Priority Data

Jul. 11, 2018 (EP) .................................... 18182903

(51) Int. Cl.
*H04N 5/378* (2011.01)
*H04N 5/3745* (2011.01)
*H04N 5/365* (2011.01)
*H04N 5/357* (2011.01)

(52) U.S. Cl.
CPC .......... *H04N 5/378* (2013.01); *H04N 5/3575* (2013.01); *H04N 5/3655* (2013.01); *H04N 5/3745* (2013.01)

(58) Field of Classification Search
CPC .... H04N 5/3575; H04N 5/378; H04N 5/3658; H04N 5/3655; H04N 5/357; H04N 5/3745
See application file for complete search history.

(56) References Cited

U.S. PATENT DOCUMENTS

| | | |
|---|---|---|
| 2005/0092895 A1 | 5/2005 | Fossum |
| 2008/0218608 A1 | 9/2008 | Rossi et al. |
| 2009/0033759 A1 | 2/2009 | Wakabayashi |
| 2009/0085141 A1* | 4/2009 | Peizerat ............... H04N 5/3658 257/443 |
| 2009/0278963 A1 | 11/2009 | Shah et al. |
| 2010/0271517 A1 | 10/2010 | De Wit et al. |

(Continued)

OTHER PUBLICATIONS

European Search Report, European Patent Application No. 18182903.7 dated Oct. 8, 2018, 5 pages.

(Continued)

*Primary Examiner* — Albert H Cutler
(74) *Attorney, Agent, or Firm* — McDonnell Boehnen Hulbert & Berghoff LLP

(57) ABSTRACT

Example embodiments relate to an image sensor and a method for read-out of pixel signal. One embodiment includes an image sensor. The image sensor includes an array of pixels for detecting light incident on the pixel. The image sensor also includes an in-pixel correlated double sampling (CDS) circuitry. The image sensor also includes a column line that extends along and is associated with a column of pixels in the array of pixels. The column line is configured to selectively receive a pixel signal from a pixel in the column. Further, the image sensor includes a voltage-drop correction line that extends along and is associated with the column of pixels. The voltage-drop correction line is configured to provide a correction voltage signal to a pixel in the column such that corrects for voltage drop of the pixel signal in read-out through the column line.

15 Claims, 5 Drawing Sheets

(56) References Cited

U.S. PATENT DOCUMENTS

| | | | |
|---|---|---|---|
| 2011/0069191 A1* | 3/2011 | Jung | H04N 5/374 |
| | | | 348/222.1 |
| 2012/0092533 A1* | 4/2012 | Komori | H04N 5/3658 |
| | | | 348/251 |
| 2012/0312967 A1* | 12/2012 | De Wit | H04N 5/3575 |
| | | | 250/214 A |
| 2013/0207960 A1* | 8/2013 | Arques | H04N 5/3658 |
| | | | 345/212 |
| 2014/0027640 A1 | 1/2014 | Yang | |
| 2015/0201141 A1 | 7/2015 | Petilli | |
| 2015/0312502 A1* | 10/2015 | Borremans | H04N 5/3745 |
| | | | 348/301 |
| 2016/0100114 A1 | 4/2016 | Bergey et al. | |
| 2018/0227529 A1* | 8/2018 | Mo | H04N 5/37457 |

OTHER PUBLICATIONS

Inoue, Toru et al., "A CMOS Active Pixel Images Sensor With In-Pixel CDS for High-Speed Cameras", Sensors and Camera Systems for Scientific, Industrial, and Digital Photography Applications V, Proc. of SPIE-IS&T Electronic Imaging, SPIE, vol. 5301, 2004, pp. 250-257.

\* cited by examiner

IMAGE SENSOR AND A METHOD FOR READ-OUT OF PIXEL SIGNAL

CROSS-REFERENCE TO RELATED APPLICATIONS

The present application is a non-provisional patent application claiming priority to European Patent Application No. EP 18182903.7, filed Jul. 11, 2018, the contents of which are hereby incorporated by reference.

FIELD OF THE DISCLOSURE

The present disclosure relates to an image sensor. In particular, the present disclosure relates to an image sensor using in-pixel correlated double sampling and a method for reading out a pixel signal from such a pixel.

BACKGROUND

Correlated double sampling (CDS) is a technique used in image sensors for reducing pixel noise. Usually implemented in the readout, the CDS includes sampling of both a reset voltage and a signal voltage. The two voltages are then subtracted in analog domain (analog CDS) or first converted by an analog-to-digital converter and then subtracted in the digital domain (digital CDS). As a result, such noise reduction technique using sampling of two voltages implies that acquiring a pixel value is associated with a double reading of a pixel voltage, such that a speed of acquiring the pixel value is reduced by a factor 2. This may be very critical for high speed sensors.

In order to avoid the reduction in speed, CDS may be implemented in-pixel and the difference between the signal and the reset voltage is provided at output of the pixel in a single reading of a pixel voltage.

When the CDS is done at column level (analog CDS) or after the analog-to-digital conversion (digital CDS), a fixed pattern noise (FPN) due to the pixel array is removed. However, when in-pixel CDS is used, there may be a remaining FPN in read-out of pixel signals which is not removed. Therefore, it would be desired to further improve FPN handling in image sensors using in-pixel CDS.

SUMMARY

A first aspect of the disclosure provides an image sensor using in-pixel CDS, which is configured for generating a low noise level in read-out of signals.

This and other aspects are described in the independent claims. Additional embodiments are set out in the dependent claims.

According to a first aspect, there is provided an image sensor, comprising: an array of pixels for detecting light incident on the pixel, wherein each pixel in the array comprises a photodetector for generating a photointegrated signal corresponding to an amount of light incident on the photodetector, and an in-pixel correlated double sampling (CDS) circuitry, wherein the in-pixel CDS circuitry is connected to the photodetector and is configured to output a CDS signal representative of a difference between the photointegrated signal and a reset signal; a column line, which extends along and is associated with a column of pixels in the array, which column line is configured to selectively receive a pixel signal from a pixel in the column for reading out a value indicative of amount of light incident on the photodetector of the pixel; a voltage-drop correction line, which extends along and is associated with the column of pixels, wherein the voltage-drop correction line is configured to provide a correction voltage signal to a pixel in the column such that the correction voltage signal is added to the CDS signal for forming the pixel signal from the pixel received by the column line and corrects for voltage drop of the pixel signal in read-out through the column line.

It is an insight of the disclosure that CDS performed in a pixel will not account for a voltage drop generated across a pixel column by a source follower bias current, the voltage drop being due to resistance of the column line. Since read-out pixel values are made through a shared column line, there will be a voltage drop affecting the pixel signal received by the column line and the voltage drop is varying in dependence of a position of the pixel in the column. Thus, the voltage drop may result in a vertical gradient, which may be seen as a shading of the image. This voltage drop may become critical for image sensors having a large array of pixels (and hence long column lines) and for high speed image sensors, which may use high bias currents in order to cope with strict settling requirements.

In some embodiments, the image sensor is provided with a voltage-drop correction line which, in addition to the column line, extends along the column of pixels. A correction voltage signal may be provided by the voltage-drop correction line to the pixel, such that a loss in signal value due to the voltage drop in the column line may be compensated for by a corresponding correction voltage being added to the CDS signal for output of the pixel signal.

Thus, the image sensor may be configured to provide a read-out of pixel signals with a reduced fixed pattern noise (FPN), since any FPN due to the voltage drop along the column line is compensated for in the read-out signal. This implies that a need of post processing image information to remove or reduce FPN may be eliminated or reduced.

Also, FPN provides an offset of a signal, which may affect a maximum signal that may be handled by an analog-to-digital converter. Thus, by reducing or eliminating the FPN, a dynamic range of the image sensor may be improved.

Since the voltage-drop correction line extends along pixels in a similar manner as the column line, the voltage-drop correction line may be able to provide a compensation for the voltage drop for all the pixels in the column. Thus, a single voltage-drop correction line may be used by all pixels in the column.

According to an embodiment, each pixel comprises a storage capacitor, which is connected to the CDS circuitry and is configured to store the CDS signal.

Thus, the pixel may be configured to store the CDS signal within the pixel. This may facilitate adding the correction voltage signal when the pixel signal is to be read out from the pixel.

According to an embodiment, each pixel further comprises a sample switching transistor, which is configured to selectively connect a plate of the storage capacitor to ground.

The sample switching transistor may enable controlling a connection to the storage capacitor. Thus, the sample switching transistor may control a connection of the plate of the storage capacitor to ground, which may be used when storing the CDS signal on the storage capacitor. However, thanks to the sample switching transistor, the plate of the storage capacitor may also be disconnected from ground, which may enable compensation by the correction voltage signal.

According to an embodiment, the sample switching transistor is connected to a sample control line for receiving a sample control signal to activate the sample switching transistor and connect the storage capacitor to ground during integration of light incident on the photodetector for storing the CDS signal.

Thus, the sample control line may provide a control of the sample switching transistor so as to set a timing of when the plate of the storage capacitor is to be connected to ground. The sample control signal may ensure that the storage capacitor is connected to ground during integration of light incident on the photodetector.

According to an embodiment, each pixel further comprises a read-out switching transistor, which is configured to selectively connect a plate of the storage capacitor to the voltage-drop correction line.

The read-out switching transistor may enable controlling a connection to the storage capacitor. Thus, the read-out switching transistor may control a connection of the plate of the storage capacitor to the voltage-drop correction line, such that a signal on the voltage-drop correction line may be added to the signal stored on the storage capacitor. However, thanks to the read-out switching transistor, the plate of the storage capacitor may also be disconnected from the voltage-drop correction line, which may be used during integration of light incident on the photodetector.

The connection of the voltage-drop correction line to the storage capacitor via the read-out switching transistor ensures that a straightforward circuitry (with few components) enables providing of the correction voltage signal.

According to an embodiment, the read-out switching transistor is connected to a read-out control line for receiving a read-out control signal to activate the read-out switching transistor and connect the storage capacitor to the voltage-drop correction line during read-out of the pixel signal for adding the correction voltage signal to the CDS signal.

Thus, the read-out control line may provide a control of the read-out switching transistor so as to set a timing of when the plate of the storage capacitor is to be connected to the voltage-drop correction line. The read-out control signal may ensure that the storage capacitor is connected to the voltage-drop correction line when a pixel signal is to be read out, such that the correction voltage signal is added to the CDS signal for forming the pixel signal being read out.

According to an embodiment, the column line and the voltage-drop correction line are formed as identical lines along the column of pixels.

This implies that the column line and the voltage-drop correction line may have identical characteristics, such that the similar vertical gradients may be generated on both lines. This may facilitate correction for voltage drop as the voltage-drop correction line may provide a correction voltage signal to each pixel in the column corresponding to the voltage drop to which the pixel signal from the pixel is exposed during read out of the pixel signal.

According to an embodiment, the column line is associated with a column-line current source for providing a bias current on the column line and the voltage-drop correction line is associated with a voltage-drop correction current source for providing a bias current on the voltage-drop correction line.

Thus, the image sensor may provide a current source for each of the column line and the voltage-drop correction line. The current sources may be controlled to provide bias currents such that similar voltage drops occur along the lines for correcting for the voltage drop to which the pixel signal is exposed. When the column line and the voltage-drop correction line are identical, the current sources may provide equal bias currents on the column line and the voltage-drop correction line.

According to an embodiment, the column-line current source and the voltage-drop correction current source are configured to provide equal bias currents on the column line and the voltage-drop correction line.

This may be a straightforward implementation of the voltage-drop correction, as a single current level for the bias currents may be used both for the column line and the voltage-drop correction line.

When the column line and the voltage-drop correction line are identical, the use of equal bias currents may ensure that the correction voltage signal is equal to the voltage drop to which the pixel signal is exposed.

According to an embodiment, the voltage-drop correction current source is configured to be controlled to provide a bias current which is larger than the bias current provided by the column-line current source, wherein the voltage-drop correction current source is controlled based on a calibration value to compensate for a gain of a source follower for reading out the pixel signal to the column line being lower than 1.

If the gain of the source follower is lower than 1, the correction voltage signal may not completely remove the FPN introduced by the voltage drop to which the pixel signal is exposed. In some embodiments, especially when the gain of the source follower is close to 1, correction provided by the correction voltage signal using equal bias currents may be considered sufficient to provide a satisfactory FPN level of read-out pixel signals.

However, if a very accurate correction is desired, a calibration may be performed to take the gain of the source follower into account. In such case, the bias current provided on the voltage-drop correction line may be so large that when the addition to the pixel signal provided by the correction voltage signal is read out to the column line with the gain of the source follower, the correction voltage signal will provide a contribution to the read-out signal that corrects for the voltage drop to which the pixel signal is exposed.

A similar calibration may be used for all columns in the array, as it may be assumed that the gain of the source follower is equal or very similar for all pixels in the array.

According to an embodiment, the column-line current source and the voltage-drop correction current source are arranged at opposite sides in relation to the column of pixels. Thus, the column-line current source may be arranged in the column line close to a pixel at a first end of the column, whereas the voltage-drop correction current source may be arranged in the voltage-drop correction line close to a pixel at a second, opposite end of the column. This implies that the voltage-drop correction line may provide a large correction voltage signal to the pixels close to the second end, which also is exposed to a large voltage drop in read out of the pixel signal. Hence, the voltage-drop correction line may provide a correction voltage signal which corrects for the voltage drop to which each pixel signal for the column of pixels is exposed.

According to another embodiment, the column-line current source and the voltage-drop correction current source are arranged at a common side in relation to the column of pixels.

This may be used with a folded voltage-drop correction line such that the current sources may be arranged very close to each other, which may be beneficial for matching of the current sources. Thus, the arrangement of the current sources on a common side in relation to the column of pixels may facilitate control of the bias currents in the column line and the voltage-drop correction line to be equal.

However, it should be realized that any mismatch in currents due to the column-line current source and the voltage-drop correction current source being arranged at opposite sides of the column of pixels may be compensated for through calibration. However, such calibration may be individually performed for each column of the array as a mismatch may not be similar for all columns.

According to an embodiment, the array of pixels comprises a plurality of columns, wherein the image sensor further comprises a plurality of column lines and voltage-drop correction lines such that one column line and one voltage-drop correction line is associated with each column of pixels.

Thus, the voltage-drop correction may be provided throughout the array for each column. This may be achieved by each column being associated with both a column line and a voltage-drop correction line.

According to a second aspect, there is provided a method for read-out of pixel signal representative of a detected amount of light from a pixel in an array of pixels, comprising: generating a photointegrated signal representative of an amount of light incident on a photodetector of the pixel during a sampling period and forming a correlated double sampling, CDS, signal representative of a difference between the photointegrated signal and a reset signal; storing the CDS signal in the pixel; adding a correction voltage signal to the CDS signal for forming the pixel signal, wherein the correction voltage signal is provided to the pixel from a voltage-drop correction line, which extends along a column of pixels in the array; reading out the pixel signal to a column line, which extends along the column of pixels, wherein the correction voltage signal corrects for voltage drop of the pixel signal in read-out through the column line.

Effects and features of this second aspect are largely analogous to those described above in connection with the first aspect. Embodiments mentioned in relation to the first aspect are largely compatible with the second aspect.

The method may be configured to provide a read-out of pixel signals with a reduced FPN, since any FPN due to the voltage drop along the column line may be compensated for or reduced in the read-out signal.

According to an embodiment, the method further comprises providing a sample control signal to selectively activate a sample switching transistor to connect a storage capacitor to ground during integration of light incident on the photodetector for storing the CDS signal on the storage capacitor.

Thus, the method may provide a timing of when the plate of the storage capacitor is to be connected to ground to ensure that the storage capacitor is connected to ground for forming the CDS signal during integration of light.

According to an embodiment, the method further comprises providing a read-out control signal to selectively activate a read-out switching transistor to connect the storage capacitor to the voltage-drop correction line during read-out of the pixel signal for adding the correction voltage signal to the CDS signal.

Thus, the method may provide a timing of when the plate of the storage capacitor is to be connected to the voltage-drop correction line to ensure that the correction voltage signal is added to the CDS signal for forming the pixel signal being read out.

BRIEF DESCRIPTION OF THE DRAWINGS

The above, as well as additional features will be better understood through the following illustrative and non-limiting detailed description, with reference to the appended drawings. In the drawings like reference numerals will be used for like elements unless stated otherwise.

DETAILED DESCRIPTION

Figure 1:
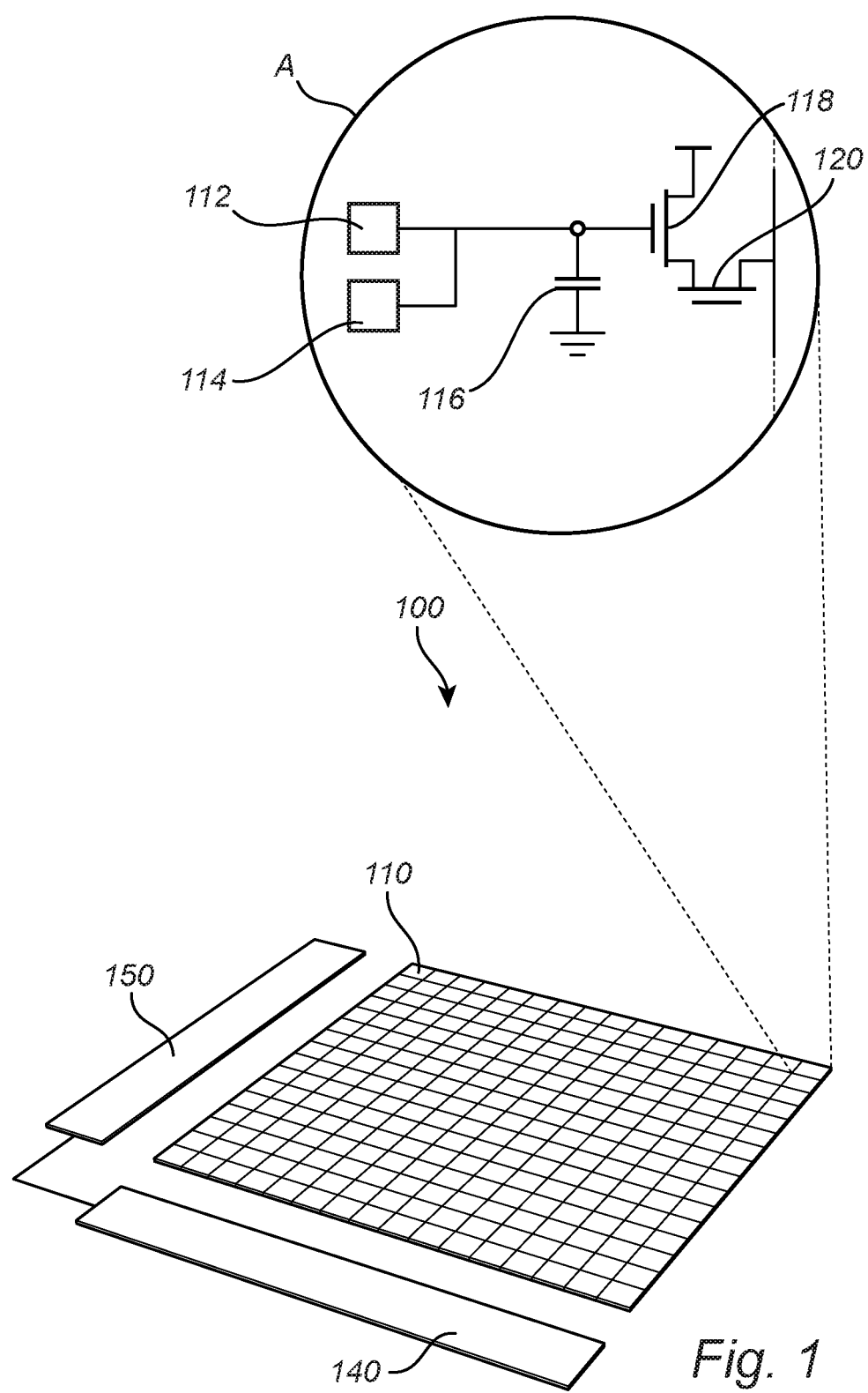
FIG. 1 is a schematic view of an image sensor, according to example embodiments.

Referring now to FIG. 1, an image sensor 100 according to an embodiment will be generally described. The image sensor 100 may comprise a plurality of pixels 110 arranged in an array.

The pixels 110 may be arranged in columns and rows of the array. The columns may extend in a perpendicular direction to the rows in the array. It should be realized that the terms columns and rows of the array is merely a nomenclature for referring to perpendicular directions in the array. In the context of this application, read-out of pixel signals is made along a direction of columns. Thus, the direction in which pixel signals are read out in the image sensor 100 defines the direction of columns in the array, regardless of any other layout of the array, such as a number of pixels in columns and rows.

As illustrated in the magnification A in FIG. 1, each pixel 110 may comprise a photodetector 112. The photodetector 112 may be formed as an area of e.g. semiconductor material which, when exposed to electromagnetic radiation, will generate charge carriers in relation to an amount of electromagnetic radiation being incident on the photodetector area.

The generated charge carriers during an integration period may be accumulated and possibly amplified so as to form a photointegrated signal corresponding to the accumulated charge carriers in the photodetector 112. The photodetector 112 may be reset before an integration time starts, which will set the photodetector 112 and/or an amplifier connected to the photodetector 112 to a reset voltage level, i.e. a reset signal.

The pixel 110 may further comprise in-pixel correlated double sampling (CDS) circuitry 114, which may be connected to the photodetector 112 or amplifier in order to receive the reset signal to acquire the reset voltage level when the photodetector 112 is reset. The in-pixel CDS circuitry 114 may further store the reset signal so as to enable removing an offset and noise provided by the reset signal from the photointegrated signal. Hence, during the integration period, the photointegrated signal may be provided in relation to the reset signal so as to form a CDS signal, which represents a difference between the photointegrated signal and the reset signal.

As is appreciated, the photodetector 112, and the in-pixel CDS circuitry 114 may be achieved in many different ways and the disclosure should not be limited to any such manner, but rather is considered to function with any combination of a photodetector and in-pixel CDS circuitry which is configured to provide a CDS signal which represents a difference between the photointegrated signal and the reset signal. One example of an in-pixel CDS circuitry is described in relation to FIG. 6 of Toru Inoue, Shinji Takeuchi, Shoji Kawahito, "CMOS active pixel image sensor with in-pixel CDS for high-speed cameras", Proc. SPIE, Sensors and Camera Systems for Scientific, Industrial, and Digital Photography Applications V, 7 Jun. 2014.

The CDS signal from the photodetector 112 and the in-pixel CDS circuitry 114 may be output to be stored on a storage capacitor 116. The pixel may further comprise a source follower 118 and a row select switch 120 for outputting the CDS signal from the pixel 110 on receipt of a row select control signal at the row select switch 120.

The image sensor 100 may further comprise control lines, which may extend along columns and rows of the array of pixels 110, so as to provide control signals for controlling the pixels 110. For instance, the control lines may provide control signals for starting integration by photodetectors 112, for resetting the pixels 110, and for controlling read-out of signals.

Further, the image sensor 100 may comprise read-out circuitry 140, which is configured to receive signals from the pixels 110. The read-out circuitry 140 may comprise or be associated with analog-to-digital converters for converting analog signals representing the detected amount of electromagnetic radiation incident on the pixels 110 to digital information.

The image sensor 100 may further comprise an image processing unit, which may be configured to process the digital information to form a processed digital image. Alternatively, the image sensor 100 may be configured to output a digital representation of detected electromagnetic radiation to an external unit, which may form the digital image.

The image sensor 100 may also comprise control circuitry 150, which is configured to control functionality of the image sensor 100. The control circuitry 150 may be configured to generate control signals for controlling the pixels 110 and/or the read-out circuitry 140. The control circuitry 150 may also comprise a clock for synchronizing components of the image sensor 100 such as to, for instance, control a timing of resetting pixels 110 and a timing of an integration period.

Figure 2:
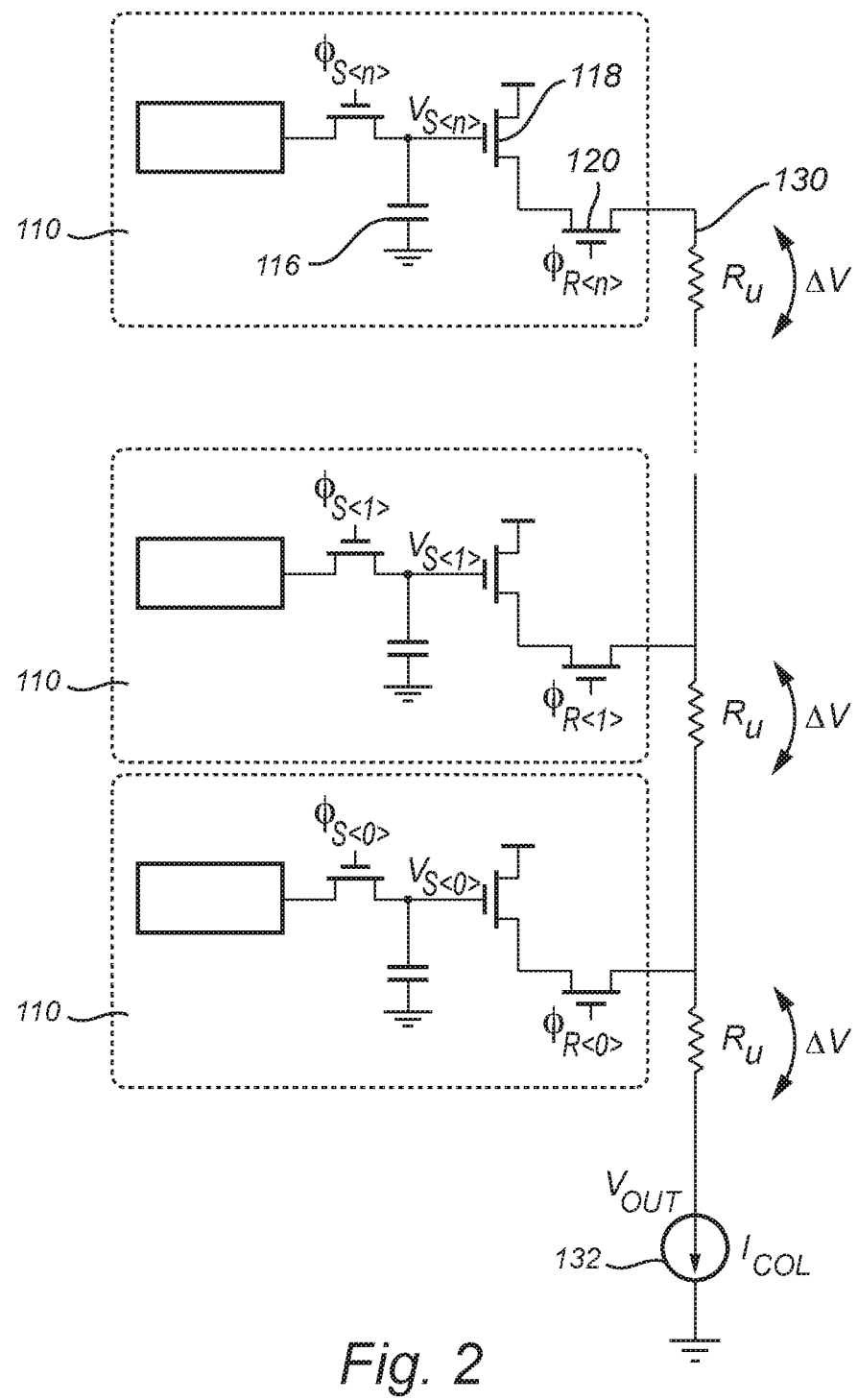
FIG. 2 is a schematic view of a column of pixels to illustrate an error in read-out output voltage due to voltage drop along a column line, according to example embodiments.

Referring now to FIG. 2, read-out of pixel signals will be generally described to illustrate a problem that is addressed by the present disclosure.

In FIG. 2, a column of pixels 110 is schematically shown. A column line 130 extends along the column of pixels 110. Based on a received row select signal, a pixel signal may be output by a pixel 110 to the column line 130. The column line 130 may be provided with a source follower bias current, generated by a current source 132 in order to allow read-out of a signal on the column line 130.

However, as illustrated in FIG. 2, a voltage drop is generated across the column line 130 based on a resistance of the line. This results in a vertical gradient in the column line, which affects the pixel signal being read out by the column line 130. As illustrated in FIG. 2, a voltage drop $\Delta V$ is associated with each pixel 110 in the column and is caused by a local resistance $R_u$ of a length of the column line 130 corresponding to the size of a pixel 110. The voltage drop $\Delta V$ associated with each pixel is $\Delta V = R_u * I_{COL}$, where $I_{COL}$ is the bias current through the column line 130.

The output voltage $V_{OUT}$ at a bottom of the column line 130 is given by:

$$V_{OUT} = V_{S<i>} A_{SF} - (i+1) R_u I_{COL},$$

where $V_{S<i>}$ is a voltage read out from pixel <i>, where pixels are counted starting from the bottom of the column, and $A_{SF}$ is the gain of the source follower. The output voltage thus contains the target signal ($V_{S<i>} A_{SF}$) and an error which is proportional to the distance from the selected pixel <i> to the bottom of the array.

Figure 3:
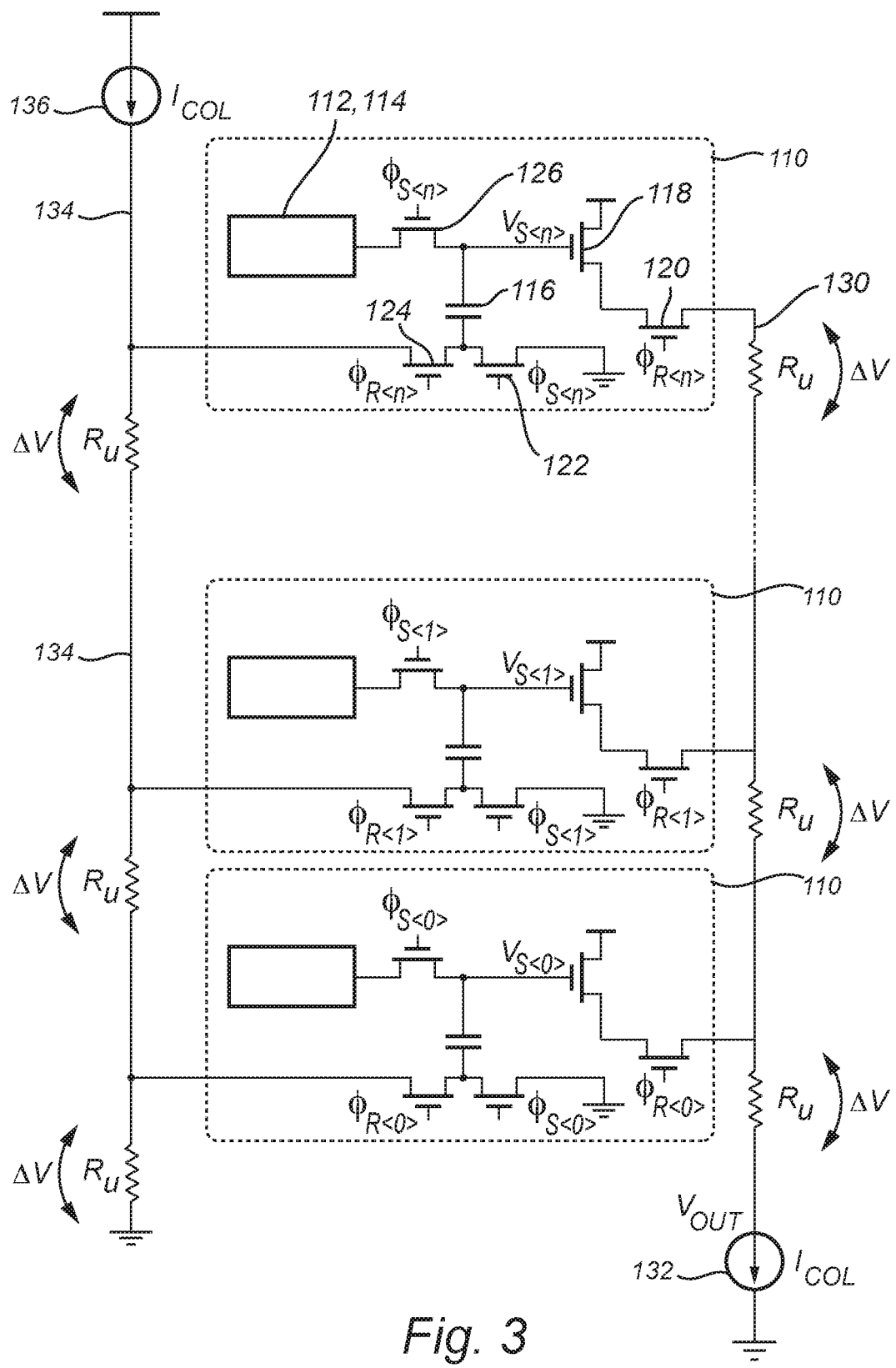
FIG. 3 is a schematic view of a column of pixels, according to example embodiments.

Referring now to FIG. 3, a column of pixels 110 according to example embodiments will be explained.

As illustrated in FIG. 3, the image sensor 100 comprises a voltage-drop correction line 134, which similar to the column line 130 extends along the column of pixels 110. The voltage-drop correction line 134 may be provided with a bias current, generated by a voltage-drop correction current source 136. The bias current on the voltage-drop correction line 134 may in relation to a resistance of the voltage-drop correction line 134 associate a voltage level with each of the pixels 110 in the column. Thus, by providing a correction voltage signal from the voltage-drop correction line 134 to a pixel 110, the voltage drop that is associated with read-out of the pixel signal along the column line 130 may be compensated for.

The voltage-drop correction line 134 may be identical to the column line 130 (formed in the same material with same thickness). Thus, a relation of the voltage provided on the voltage-drop correction line 134 as function of a position of a pixel 110 in the column may be similar to the error caused by the voltage drop along the column line 130 as a function of a position of a pixel 110 in the column. This implies that the correction voltage signal that may be provided by the voltage-drop correction line 134 at a pixel 110 in the column may correspond to the error in read out of the pixel signal through the column line 130.

The pixels 110 may comprise two transistors 122, 124 connected to a plate of the storage capacitor 116. Thus, the plate of the storage capacitor 116 may be connected to ground via a sample switching transistor 122 and may be connected to the voltage-drop correction line 134 via a read-out switching transistor 124. The sample switching transistor 122 and the read-out switching transistor 124 may thus control whether the plate of the storage capacitor 116 is connected to ground or the voltage-drop correction line 134.

Figure 4:
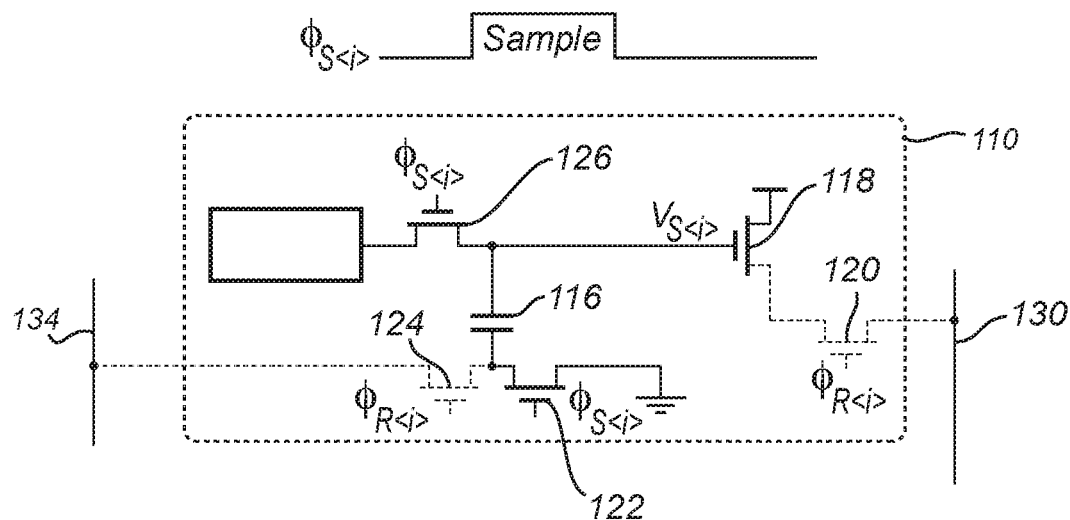
FIG. 4 is a schematic view of a pixel illustrating active components of the pixel during sampling, according to example embodiments.

As illustrated in FIG. 4, during integration a control signal $\phi_{S<i>}$ on a sample control line may be provided to a pixel <i> for activating a transistor 126 so as to connect the photodetector 112 and in-pixel CDS circuitry 114 to the storage capacitor 116. Also, the control signal $\phi_{S<i>}$ may be provided to the pixel 110 for activating the sample switching transistor 122 to connect the storage capacitor 116 to ground. This implies that a CDS signal is sampled to the storage capacitor 116 to be held by the storage capacitor 116. As is also clear from FIG. 4, during the transfer of the CDS signal to the storage capacitor 116, the read-out switching transistor 124 is not active, such that the storage capacitor 116 is not connected to the voltage correction line 134.

Figure 5:
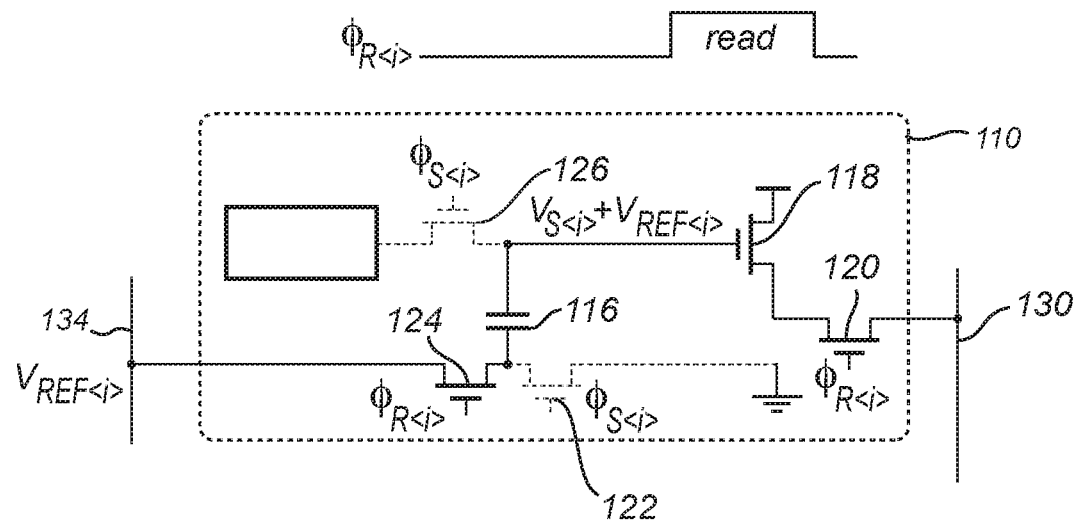
FIG. 5 is a schematic view of a pixel illustrating active components of the pixel during read-out, according to example embodiments.

As further illustrated in FIG. 5, when the pixel signal is to be read out, a control signal $\phi_{R<i>}$ on a read-out control line may be provided to the pixel <i>. Then, the read-out switching transistor 124 is activated to connect the storage capacitor 116 to the voltage-drop correction line 134 and add a correction voltage signal to the CDS signal for forming the pixel signal. Further, the control signal $\phi_{R<i>}$ may be provided to the row select switch 120 for providing the pixel signal to the column line 130. As is also clear from FIG. 5, during the read-out of the pixel signal, transistor 126 is not active, such that the storage capacitor 116 is not connected to the photodetector 112 and the in-pixel CDS circuitry 114.

Thus, a pixel signal corresponding to a sum of the CDS signal, $V_{S<i>}$, and the correction voltage signal, $V_{REF<i>}$, may be provided to the source follower 118. This signal may be output to the column line 130 via the source follower 118 and is hence affected by the gain of the source follower 118.

The output voltage $V_{OUT}$ at a bottom of the column line 130 may then be given by:

$$V_{OUT}=V_{S<i>}A_{SF}+V_{REF<i>}A_{SF}-(i+1)R_uI_{COL}.$$

Thanks to the addition of the correction voltage signal, which may be inversely proportional to the distance from the selected pixel <i> to the bottom of the array, the image sensor 100 may be able to correct for an error in read-out pixel values due to voltage drop in the column line 130.

A bias current $I_{COL'}$ on the voltage-drop correction line 134 may be set to be equal to the bias current $I_{COL}$ on the column line 130. In such case, the output voltage $V_{OUT}$ at a bottom of the column line 130 may be given by:

$$V_{OUT}=V_{S<i>}A_{SF}-(i+1)R_u(I_{COL}-I_{COL'}A_{SF}).$$

Thus, if the bias currents, $I_{COL}$, $I_{COL'}$, are equal, the error due to voltage drop may be completely compensated for if the gain of the source follower 118 is equal to 1.

The gain of the source follower 118 may be assumed to be equal to or at least close to 1. Thus, by providing equal bias currents, the error due to voltage drop may be compensated to at least a large extent.

According to an embodiment, a compensation for the source follower gain being different from 1 may also be provided. In such case, a calibration may be performed to determine the gain of the source followers 118. Then, the bias current $I_{COL'}$ on the voltage-drop correction line 134 may be set to be larger than the bias current $I_{COL}$ on the column line 130 so as to adjust the correction voltage signal such that the error due to voltage drop may be accurately compensated for.

As illustrated in FIG. 3, the column-line current source 132 and the voltage-drop correction current source 136 may be arranged at opposite sides in relation to the column of pixels 110. This implies that the voltage-drop correction line 134 provides a large correction voltage signal to the pixels close to an end of the column of pixels 110, which also is exposed to a large voltage drop in read out of the pixel signal. Hence, the voltage-drop correction line 134 may provide a correction voltage signal which corrects for the voltage drop to which each pixel signal for the column of pixels 110 is exposed.

However, arranging the column-line current source 132 and the voltage-drop correction current source 136 at opposite sides of the column of pixels 110 may result in a mismatch in currents due to the column-line current source 132 and the voltage-drop correction current source 136 being arranged far apart. Such mismatch may be compensated for through calibration to set a corresponding current $I_{COL'}$ based on the calibration. The calibration may be individually performed for each column of the array.

According to an alternative, the column-line current source 132 and the voltage-drop correction current source 136 are arranged at a common side in relation to the column of pixels 110 to reduce a risk of a mismatch in the currents. In such case, the voltage-drop correction line 134 may be folded such that the correct reference voltage is provided at the pixels 110.

Figure 6:
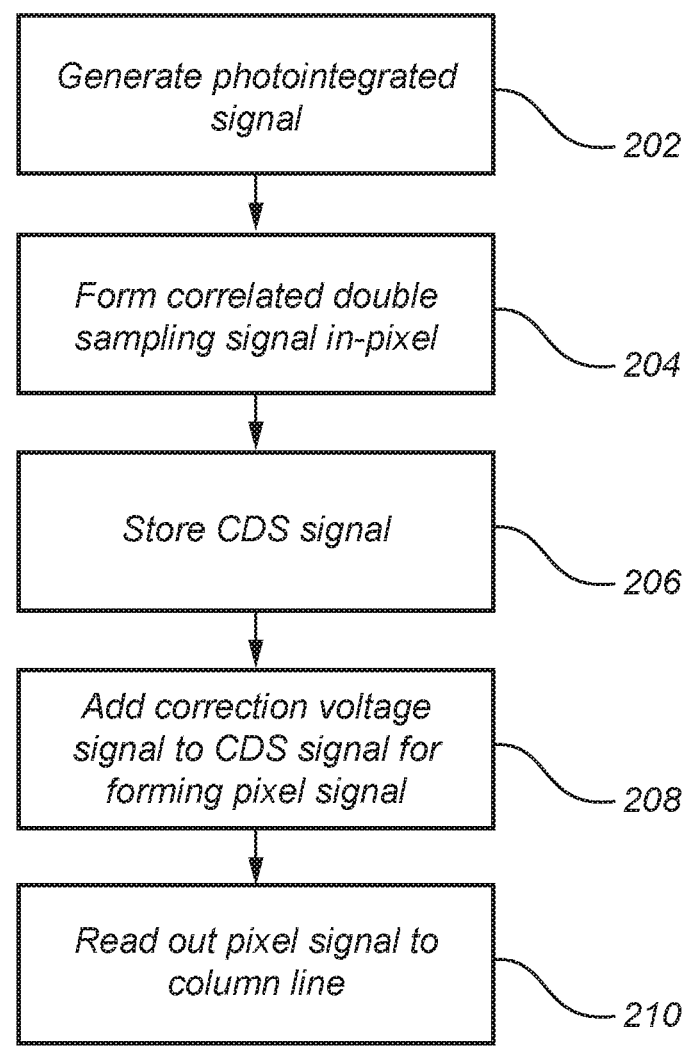
FIG. 6 is a flow chart of a method, according to example embodiments.

Referring now to FIG. 6, a method for read-out of pixel signals will be summarized.

The method comprises that an image sensor receives incident light on an array of pixels. The pixels generate 202 a photointegrated signal representative of an amount of light incident on a photodetector of the pixel during a sampling period. Further, the pixels form 204 a CDS signal representative of a difference between the photointegrated signal and a reset signal of the pixel.

Then, the pixels store 206 the CDS signal. Thus, the CDS signal is held for later read-out when a read-out circuitry is ready to receive information from the pixel. The CDS signal may be stored on a storage capacitor which is selectively connected to ground during sampling.

Further, when a signal is to be read out from a pixel, the pixel adds 208 a correction voltage signal to the CDS signal for forming the pixel signal. The correction voltage signal is provided to the pixel from a voltage-drop correction line, which extends along a column of pixels in the array. The correction voltage signal may be added to the CDS signal based on a read-out control signal which selectively connects the storage capacitor to the voltage-drop correction line (instead of ground) to add the correction voltage signal on the voltage-drop correction line to the CDS signal.

Finally, the pixel signal being formed by the CDS signal and the correction voltage signal is read out 210 to a column line. The addition of the correction voltage signal corrects for voltage drop of the pixel signal in read-out through the column line.

In the above, a limited number of example embodiments have been described. However, as is readily appreciated, other examples than the ones disclosed above are equally possible within the scope of the disclosure, as defined by the appended claims.

What is claimed is:

1. An image sensor, comprising:
   an array of pixels for detecting light incident on the pixel, wherein each pixel in the array comprises:
      a photodetector for generating a photointegrated signal corresponding to an amount of light incident on the photodetector; and
      an in-pixel correlated double sampling (CDS) circuitry, wherein the in-pixel CDS circuitry is connected to the photodetector and is configured to output a CDS signal representative of a difference between the photointegrated signal and a reset signal;
   a column line,
   wherein the column line extends along and is associated with a column of pixels in the array of pixels, and
   wherein the column line is configured to selectively receive a pixel signal from a pixel in the column for reading out a value indicative of the amount of light incident on the photodetector of the pixel; and
   a voltage-drop correction line,
   wherein the voltage-drop correction line extends along and is associated with the column of pixels, and
   wherein the voltage-drop correction line is configured to provide a correction voltage signal to a pixel in the column such that the correction voltage signal is added to the CDS signal for forming the pixel signal from the pixel received by the column line and corrects for voltage drop of the pixel signal in read-out through the column line.

2. The image sensor according to claim 1,
   wherein each pixel comprises a storage capacitor, and
   wherein the storage capacitor is connected to the CDS circuitry and is configured to store the CDS signal.

3. The image sensor according to claim 2,
wherein each pixel further comprises a sample switching transistor, and
wherein the sample switching transistor is configured to selectively connect a plate of the storage capacitor to ground.

4. The image sensor according to claim 3, wherein the sample switching transistor is connected to a sample control line for receiving a sample control signal to activate the sample switching transistor and connect the storage capacitor to ground during integration of light incident on the photodetector for storing the CDS signal.

5. The image sensor according to claim 2,
wherein each pixel further comprises a read-out switching transistor, and
wherein the read-out switching transistor is configured to selectively connect a plate of the storage capacitor to the voltage-drop correction line.

6. The image sensor according to claim 5, wherein the read-out switching transistor is connected to a read-out control line for receiving a read-out control signal to activate the read-out switching transistor and connect the storage capacitor to the voltage-drop correction line during read-out of the pixel signal for adding the correction voltage signal to the CDS signal.

7. The image sensor according to claim 1, wherein the column line and the voltage-drop correction line are formed as identical lines along the column of pixels.

8. The image sensor according to claim 1,
wherein the column line is associated with a column-line current source for providing a bias current on the column line, and
wherein the voltage-drop correction line is associated with a voltage-drop correction current source for providing a bias current on the voltage-drop correction line.

9. The image sensor according to claim 8, wherein the column-line current source and the voltage-drop correction current source are configured to provide equal bias currents on the column line and the voltage-drop correction line.

10. The image sensor according to claim 8,
wherein the voltage-drop correction current source is configured to be controlled to provide a bias current that is larger than the bias current provided by the column-line current source, and
wherein the voltage-drop correction current source is controlled based on a calibration value to compensate for a gain of a source follower for reading out the pixel signal to the column line being lower than 1.

11. The image sensor according to claim 8, wherein the column-line current source and the voltage-drop correction current source are arranged at a common side in relation to the column of pixels.

12. The image sensor according to claim 1,
wherein the array of pixels comprises a plurality of columns, and
wherein the image sensor further comprises a plurality of column lines and voltage-drop correction lines such that one column line and one voltage-drop correction line are associated with each column of pixels.

13. A method for read-out of a pixel signal representative of a detected amount of light from a pixel in an array of pixels, comprising:
generating a photointegrated signal representative of an amount of light incident on a photodetector of the pixel during a sampling period;
forming a correlated double sampling (CDS) signal representative of a difference between the photointegrated signal and a reset signal;
storing the CDS signal in the pixel;
adding a correction voltage signal to the CDS signal for forming the pixel signal,
wherein the correction voltage signal is provided to the pixel from a voltage-drop correction line, and
wherein the voltage-drop correction line extends along a column of pixels in the array; and
reading out the pixel signal to a column line,
wherein the column line extends along the column of pixels, and
wherein the correction voltage signal corrects for voltage drop of the pixel signal in read-out through the column line.

14. The method according to claim 13, further comprising providing a sample control signal to selectively activate a sample switching transistor to connect a storage capacitor to ground during integration of light incident on the photodetector for storing the CDS signal on the storage capacitor.

15. The method according to claim 14, further comprising providing a read-out control signal to selectively activate a read-out switching transistor to connect the storage capacitor to the voltage-drop correction line during read-out of the pixel signal for adding the correction voltage signal to the CDS signal.

* * * * *